United States Patent [19]

Kumano

[11] Patent Number: 5,349,629
[45] Date of Patent: Sep. 20, 1994

[54] PORTABLE TELEPHONE WITH SPEED DIALING

[75] Inventor: Toshiya Kumano, Uji, Japan

[73] Assignee: Murata Kikai Kabushiki Kaisha, Kyoto, Japan

[21] Appl. No.: 83,658

[22] Filed: Jun. 28, 1993

[30] Foreign Application Priority Data

Jul. 8, 1992 [JP] Japan .................. 4-181342

[51] Int. Cl.$^5$ .................. H04M 11/00; H04M 1/00
[52] U.S. Cl. ...................... 379/58; 379/354; 379/355
[58] Field of Search ............... 379/58, 59, 63, 354, 379/355, 356, 357, 200, 396; 340/825.31

[56] References Cited

U.S. PATENT DOCUMENTS

| | | | |
|---|---|---|---|
| 4,275,273 | 6/1981 | Ts'Ao | 379/355 |
| 4,709,387 | 11/1987 | Masuda | 379/355 |
| 4,720,855 | 1/1988 | Ohnishi et al. | 379/354 |
| 4,794,642 | 10/1988 | Arbabzadah et al. | 379/200 |
| 4,885,762 | 12/1989 | Suzuki et al. | 379/58 |
| 5,189,696 | 2/1993 | Yoshida | 379/354 |

Primary Examiner—Curtis Kuntz
Assistant Examiner—I. S. Rana
Attorney, Agent, or Firm—Spensley Horn Jubas & Lubitz

[57] ABSTRACT

When abbreviated numbers and telephone number are registered, these numbers are divided into several groups and group numbers are assigned to the groups, respectively. The group numbers are stored in a main memory area of a RAM. If a certain group number is input, a CPU displays all the abbreviated numbers corresponding to such a group number, but does not display the telephone numbers corresponding to the abbreviated numbers. When a call limitation is registered to a group number, a call with the abbreviated numbers to which such a group number is assigned is prohibited and these abbreviated numbers and telephone numbers corresponding to the abbreviated numbers are not displayed.

13 Claims, 5 Drawing Sheets

| ABBREVIATED NO. 18a | TELEPHONE NO. 18b | GROUP NO. 18c |
|---|---|---|
| 01 | 03 – 123 – 4567 | 1 |
| 02 | 06 – 123 – 5678 | 2 |
| 03 | 06 – 123 – 6789 | 2 |
| 04 | ⋮ | 3 |
| 05 | ⋮ | 3 |
| 06 | ⋮ | 3 |
| 07 | ⋮ | * |
| | ⋮ | ⋮ |

FIG. 3

| GROUP NO. | CALL LIMITATION 18d |
|---|---|
| 1 | 0 |
| 2 | 1 |
| 3 | 0 |
| 4 | 0 |
| | |
| * | 0 |

PORTABLE TELEPHONE WITH SPEED DIALING

BACKGROUND OF THE INVENTION

1. Technical Field

The present invention relates to a portable telephone having an abbreviated number calling function (or one-touch speed dialing function).

2. Background Art

Generally, a portable telephone can be used for not only communication with a third party but other purposes (e.g., ticket reservations) like a home-use pushbutton telephone. To use the portable telephone for the latter, it is necessary to transmit a calling person's number or a secret identification number for identification. A user can combine such a number with a telephone number to make new telephone number and can register new telephone number into the portable telephone.

Portable telephones are prevailing in recent years. In some companies, each employee is given one portable telephone. In order to delimit a possible communication scope, proposed is a portable telephone which has a limited dialing function which only allows a user to call predetermined third parties having certain abbreviated numbers or "group numbers". One "group number" is assigned to a plurality of abbreviated numbers for an easier utilization of abbreviated numbers.

When a user inputs an abbreviated number to call someone or to confirm a telephone number, the telephone number corresponding to the abbreviated number is displayed. Therefore, it is impossible to hide a telephone number which may represent an access number or password of a computer and should not be known to other persons and the telephone number may be used for evil purpose.

If the portable telephone has a dialing restriction function, it is possible to limit possible calling of a group of several abbreviated numbers to which a group number is assigned, but still impossible to hide telephone numbers corresponding to the abbreviated numbers.

Specifically, when the user refers to an abbreviated number by inputting the group number, a telephone number corresponding to the abbreviated number is displayed together with the abbreviated number. When the user inputs an abbreviated number to refer to the group number, a telephone number corresponding to the abbreviated number is displayed together with the group number. Therefore, the user will see a telephone number which corresponds to the abbreviated number even if the group number is assigned to the abbreviated number and the call with the abbreviated number (speed dialing) is prohibited.

SUMMARY OF THE INVENTION

An object of the present invention is to provide a portable telephone which can hide a telephone number both in a situation where the call with an abbreviated number is permitted and a situation where it is not permitted.

According to one aspect of the present invention, there is provided a portable telephone comprising first input means for inputting telephone numbers and their abbreviated numbers, second input means for inputting group numbers (the abbreviated numbers are divided into several groups and each group is assigned one group number), first memory means for storing the abbreviated numbers in connection with the group numbers, third input means for inputting call limitation data to prohibit a call with the abbreviated number to which a certain group number is assigned, second memory means for storing the call limitation data in connection with the group numbers (the group numbers are divided into two categories: one is a speed dialing prohibited category and the other is a speed dialing permitted category), display means for displaying the abbreviated number and the telephone number, and control means for controlling the display means in accordance with the group number stored in the first memory means and/or the call limitation data stored in the second memory means.

A user can input telephone numbers and their abbreviated numbers by operating the first input means and input group numbers by the second input means. Upon these inputting operations, the first memory means stores the abbreviated numbers in connection with the group numbers. Specifically, the abbreviated numbers are divided into several groups and the group number is assigned to each group. When a certain group number is input, the control means causes the display means to display the abbreviated numbers to which such a group number is assigned. On the other hand, if the group number input by the user is another number (e.g., an asterisk), the telephone numbers corresponding to the abbreviated numbers are not displayed.

A user can set a call restriction to a particular group number by operating the third input means. The second memory means stores the group numbers in connection with the call limitation data. If the user tries to make a call with an abbreviated number to which the call limitation-imposed group number is assigned, the control means disables the call with such an abbreviated number and does not display the telephone number corresponding to such an abbreviated number.

These and other aspects, objects and advantages of the present invention will become more apparent from a following detailed description as read with the accompanying drawings and appended claims.

BRIEF DESCRIPTION OF THE DRAWINGS

FIG. 5 is a set of flowcharts in which

DETAILED DESCRIPTION OF THE PREFERRED EMBODIMENTS

Now, a preferred embodiment of the present invention will be described in reference to FIGS. 1 to 9 of the accompanying drawings.

Figure 2:
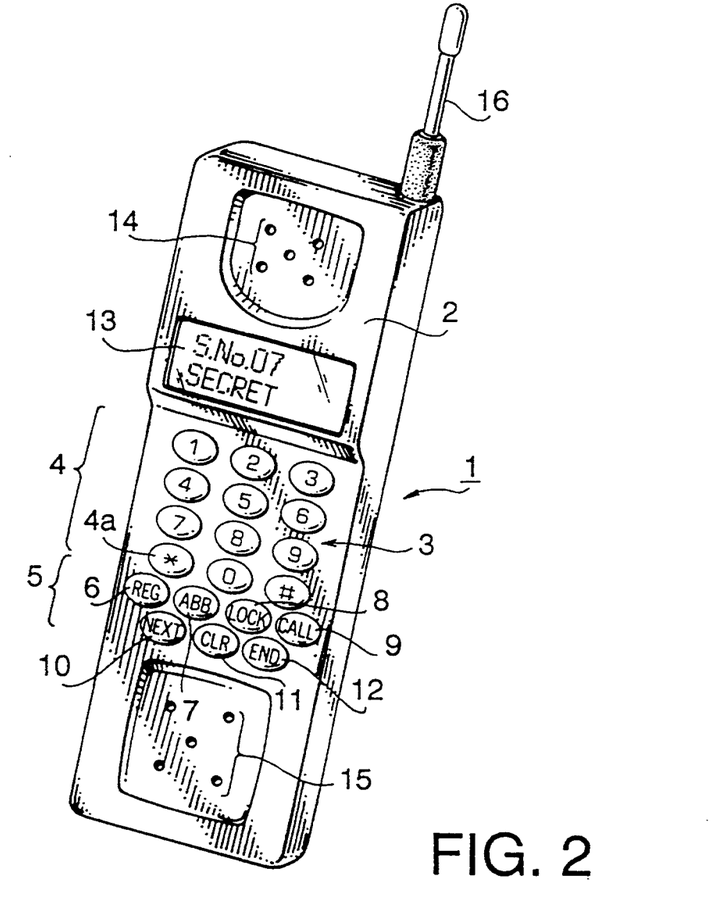
FIG. 2 is a perspective view of the portable telephone of FIG. 1.

Referring to FIG. 2, a main body 2 of a portable telephone 1 has a rectangular box-shape which may be held in a user's hand. An operation part 3 is provided in a center area of a front face of the portable telephone 1.

The operation part 3 includes a ten-key set 4 and various function key set 5. The ten-key set 4 is provided as input means for inputting telephone numbers, abbreviated numbers (speed dial numbers), group numbers and the like. The function key set 5 is comprised of two rows of keys extending below the ten-key 4. Specifically, the function key set 5 includes a registration key 6, an abbreviation key 7, a lock key 8, a call key 9, a next page key 10, a clear key 11 and an end key 12.

The registration key 6 is used to register the abbreviated numbers and the group numbers and to limit the abbreviated number calling. A detail of the group number will be explained later. The abbreviation key 7 is used for abbreviated number registration and cancellation as well as abbreviated number calling. The lock key 8 is used with the registration key 6 to limit the abbreviated number calling and to refer to the abbreviated numbers based on the group number.

The call key 9 is used to call a third party. The next page key 10 is used to successively display information such as abbreviated numbers and telephone numbers on a liquid crystal display 13. "Successively" means that the display 13 displays only part of the information if there are too much information and the remainder is displayed when the next page key 10 is pressed. The clear key 11 is used to delete the abbreviated numbers and group numbers and cancel the call limitation. The end key 12 is used, for example, to finish the communication with the third party.

On the main casing 2 above the ten-key set 4, provided is a liquid crystal display 18 as display means for displaying data input by a user upon the manipulation of the ten-key set 4 or the function key set 5. On the main casing 2 above the liquid crystal display 18, provided is a plurality of voice receiving openings 14 through which a voice of a calling party (third party) comes out from a telephone receiver (not shown). A plurality of voice sending openings 15 are formed in the main casing 4 below the ten key set 4 through which a voice of a user enters a telephone microphone (not shown). An antenna 16 is provide on the upper right corner of the main casing 2.

Next, an electric structure of the portable telephone 1 will be explained.

Figure 1:
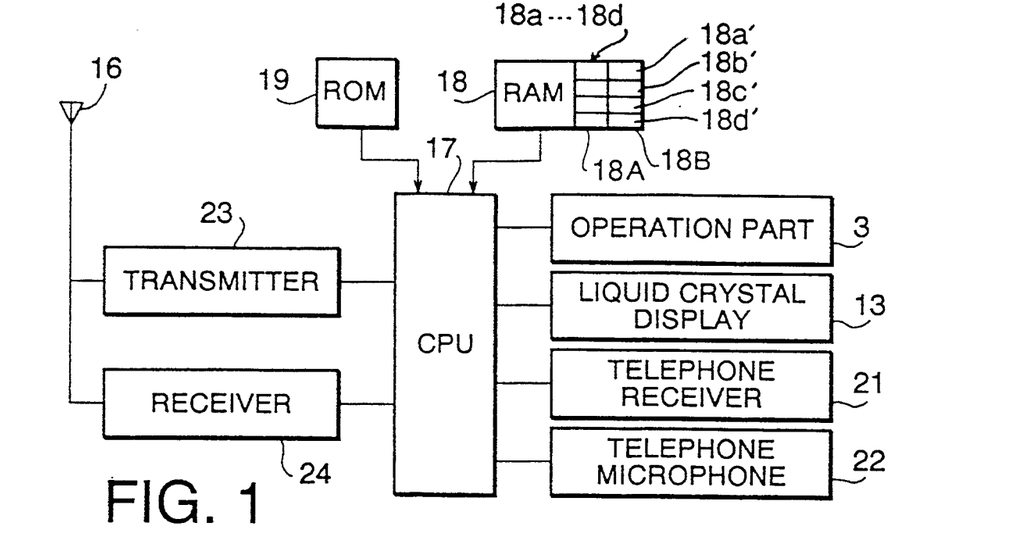
FIG. 1 is a block diagram showing an electrical structure of a portable telephone of the present invention.

As illustrated in FIG. 1, all the keys on the operation panel 3 are connected to a central processing unit (CPU) 17 which serves as control means incorporated in the portable telephone 1. The CPU 17 controls the overall functions of the portable telephone 1 on a program stored in a ROM 19.

The CPU 17 is provided with a RAM 18 which serves as first and second memory means for storing various data produced upon the execution of the program. The RAM 18 has a main memory area 18A and a work memory area 18B.

Figure 3:
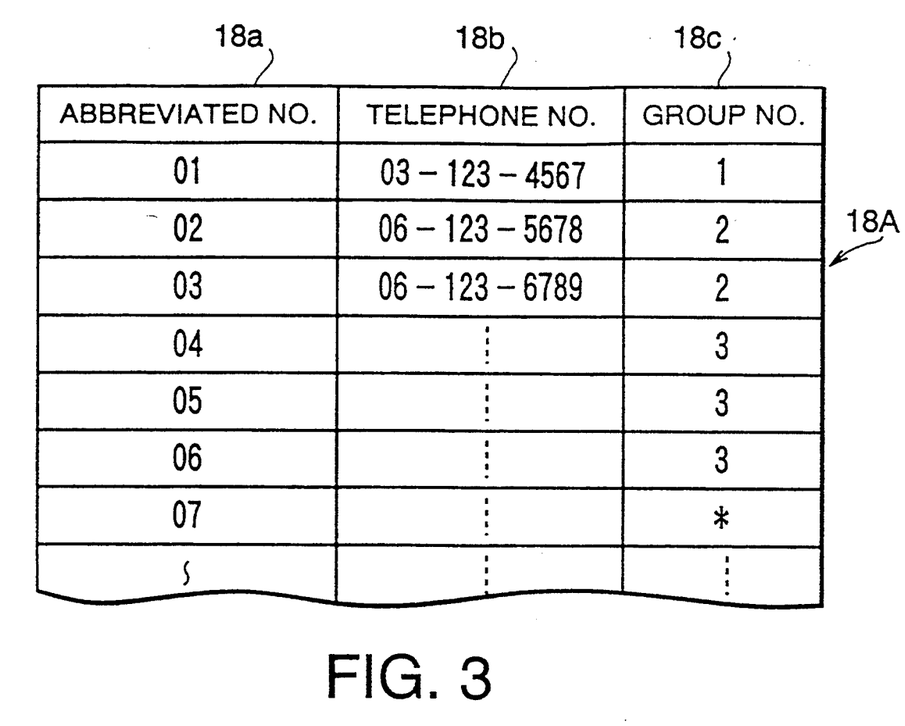
FIG. 3 shows a storage pattern of various data such as abbreviated numbers in respective memory areas according to the present invention.

Referring to FIG. 3, the main memory area 18A is comprised of an abbreviated number memory area 18a, a telephone number memory area 18b, a group number memory area 18c and a call limitation data memory area 18d.

As shown in FIG. 3, the abbreviated number memory area 18a stores 99 abbreviated number data (99 two-digit numbers) which are input by the manipulation of the ten-key set 4 and the function key set 5. The telephone number memory area 18b stores telephone number data input by the manipulation of ten-key set 4 in accordance with the abbreviated number data. The group number memory area 18c stores the group number data input by the manipulation of the ten-key set 4 in accordance with the abbreviated number data. Each group number data consists of one digit number input using the ten-key set 4 or an asterisk (*) input by the operator using an asterisk key 4a of the ten-key set 4. The group number data is stored in association with the abbreviated numbers.

When the asterisk is stored in the group number memory area 18c, the display limitation is imposed on the abbreviated number data stored in the abbreviated number memory area 18a corresponding to the asterisk. Specifically, if an abbreviated number to which the asterisk (group number) is assigned is input by the operator using the ten key-set 4 during the calling or the reference ("07" in FIG. 3), the CPU 17 does not read the telephone number data from the telephone number memory area 18b corresponding to the abbreviated number. Therefore, the telephone number is not displayed on the liquid crystal display 13.

Figure 7:
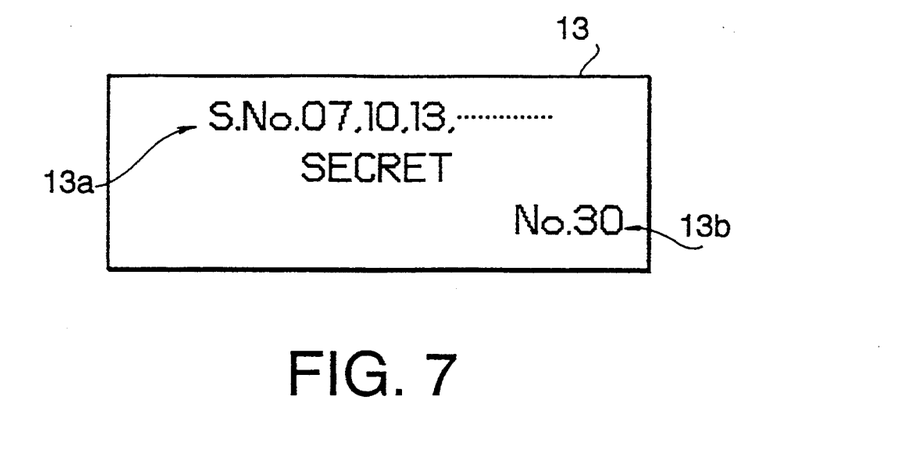
FIG. 7 shows a display when telephone numbers are not displayed.

In this case, as shown in FIG. 7, a data display area 13a in the display 13 displays, for example, the abbreviated numbers in the form of "S. No.07, 10, 13,—" and the telephone number in the form of "SECRET". If a large number of abbreviated numbers are registered so that the data display area 13a is not enough to display all the abbreviated numbers, an auxiliary display area 13b in the liquid crystal display 13 displays, for example. "No.30". In this situation, if the next page key 10 is pressed, the abbreviated number displayed on the auxiliary display area 13b and abbreviated numbers following it are displayed in the main data display area 13a.

Figure 4:
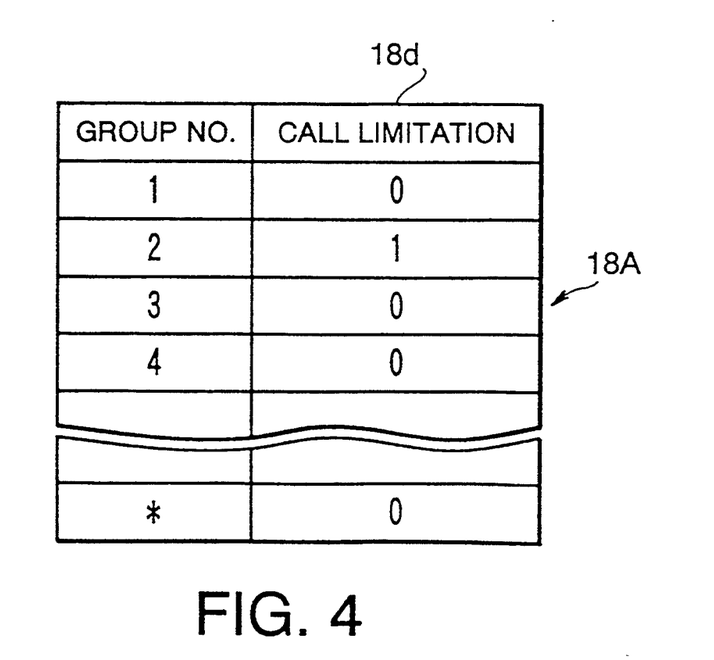
FIG. 4 shows a storage pattern in a memory device when calling is limited in accordance with a group number.

Referring now to FIG. 4, the call limitation data memory area 18d has a column of predetermined group number address (1-9 and asterisk). The attribute of the group number address, i.e., the call limitation data, is stored in the next column in the memory area 18d. "0" or "1" is stored into the call limitation data column when the operator presses the ten-key set 4 to input the group number while pressing the registration key 6 and the lock key 8.

If the call limitation data "1" is stored in the call limitation data memory area 18d, the call limitation is imposed on the group number (group number "2" in the illustrated embodiment) stored in the corresponding group number memory area 18c. Therefore, even if an abbreviated number ("02" or "03" in FIG. 3) corresponding to the group number "2" to which the call limitation has been applied is input by the user manipulating the ten-key set 4, the CPU 17 does not read or dial the telephone number data (06-123-5678 or 06-123-6789 in FIG. 3) from the telephone number memory area 18b corresponding to the abbreviated number "2".

Figure 8:
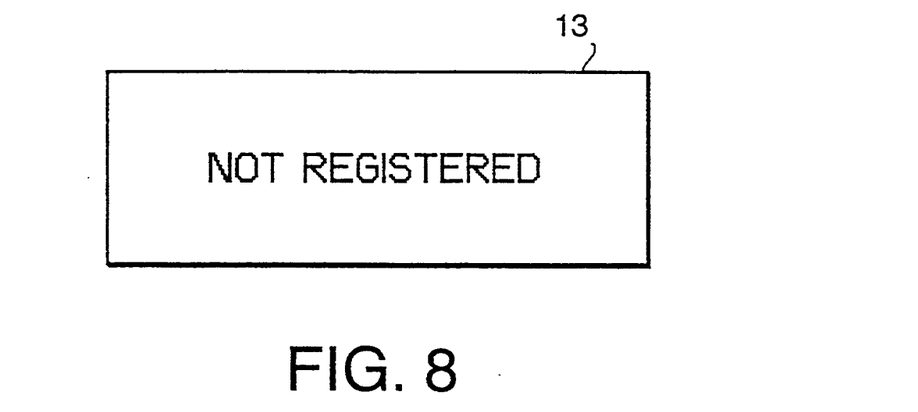
FIG. 8 shows the display when call is limited.

In this case, as shown in FIG. 8, the data display area 13a of the liquid crystal display 13 displays, for example, "NOT REGISTERED".

The work memory part 18B (FIG. 1) includes an abbreviated number memory area 18a', a telephone number memory area 18b', a group number memory area 18c' and a call limitation data memory area 18d'. Each area is used to temporarily store various data during the registration. First the user inputs an abbreviated number (e.g., two-digit number) and successively the telephone number data. The two-digit number (abbreviated number) is stored in the abbreviated number storage area 18a' and the remainder is stored in the telephone number storage area 18b'. The abbreviated number and the telephone number data are input by the user manipulating the ten-key set 4.

The CPU 17 is connected with the liquid crystal display 13, the telephone microphone 21 and the earphone 22. The CPU 17 is further connected with the transmitter 23 and the receiver 24. The transmitter 23 modulates the data sent from the telephone microphone 21 using a predetermined radio frequency band and transmits it from the antenna 16. The receiver 24 receives the data of the predetermined radio frequency band at the antenna 16, demodulates it and sends the demodulated data to the CPU 17 as the received data.

If the portable telephone 1 is used as a calling side and the user inputs a telephone number using the operation part 3, the CPU 17 controls the transmitter 23 to transmit a call signal corresponding to the telephone number. In the portable telephone of this embodiment, a touch tone is played back by the earphone 22, but if the asterisk is memorized in the group number memory area 18c (FIG. 3), the CPU 17 does not allow the playing back of the touch tone as a side tone. In other words, not only the telephone number or the secret ID number is not displayed in the liquid crystal display 13 but the touch tone is not generated.

When the portable telephone 1 is used as a called side, the receiver 24 receives a call signal and the CPU 17 generates a ringing sound using an alarm speaker (not shown) in accordance with the call signal.

Next, the operation of the portable telephone 1 having the above-described structure will be explained with the flowcharts of FIGS. 5 and 6.

The portable telephone 1 is already powered on before the "START" of the flowcharts.

Figures 5A, 5B:
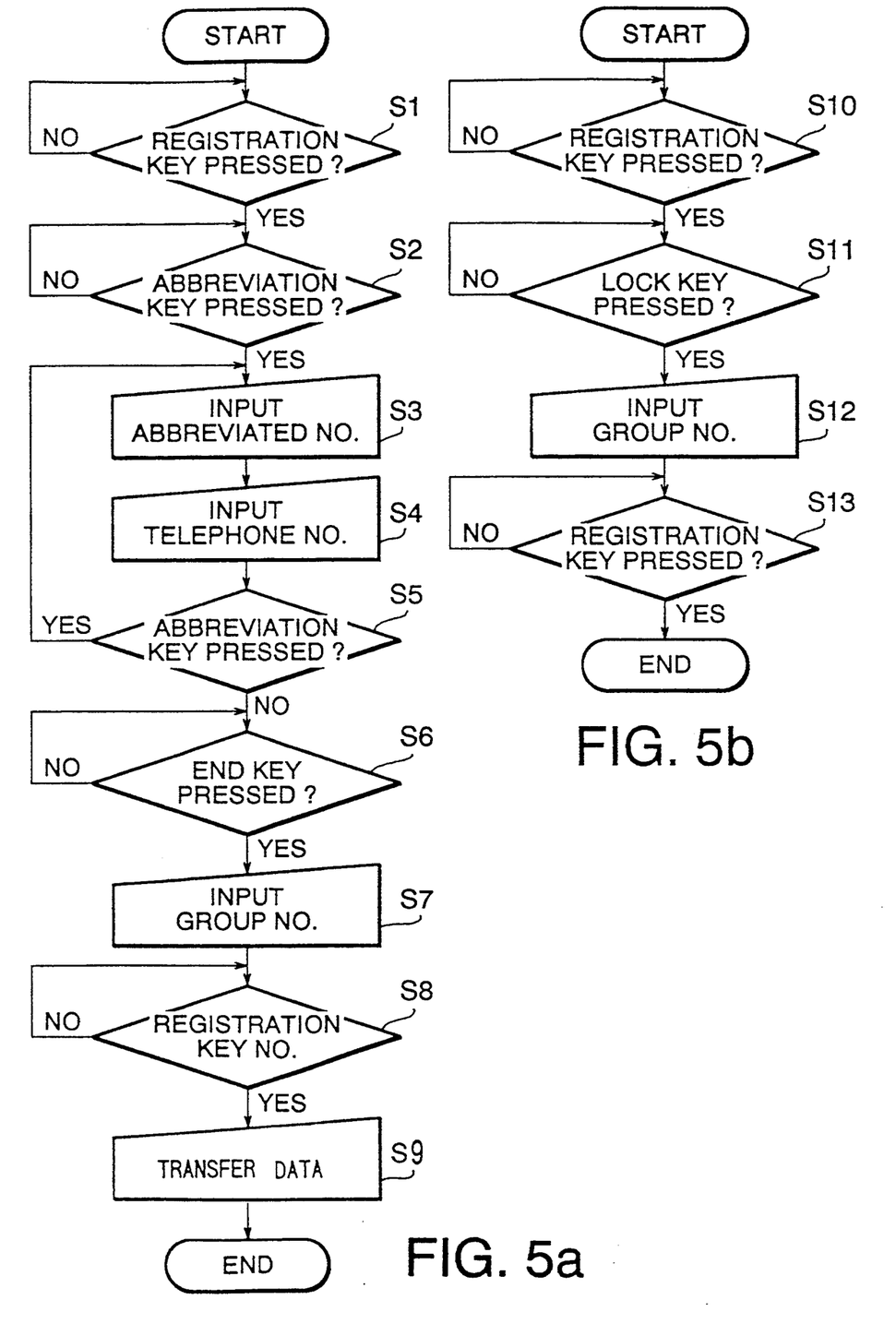
FIG. 5(a) shows a case where various numbers such as abbreviated numbers are registered and FIG. 5(b) shows a case where a group number for call limitation is registered.

FIG. 5(a) deals with the case where the group number is registered at the same time as the abbreviated number and the telephone number are registered. If the registration key 6 is pressed at step 1 and the abbreviation key 7 is pressed at step 2, the CPU 17 sets the portable telephone to the registration mode for the abbreviated numbers and the like. Then, when an abbreviated number (e.g., "01") is input by the operator using the ten-key 4 at step 3 and a telephone number (e.g., 03-123-4567) is input using the ten-key 4 at step 4, the CPU 17 stores the abbreviated number into the abbreviated number memory area 18a' of the work memory part 18B and stores the telephone number data into the telephone number memory area 18b' corresponding to the abbreviated number. If the abbreviation key 7 is pressed again at step 5, the program returns to step 3 to prepare for the next input of abbreviated and telephone numbers.

If the abbreviation key 7 is not pressed at step 5 and the end key 12 is pressed at step 6 (the end key 12 is also used to finish the conversation.), the CPU 17 judges that the inputting of the abbreviated numbers and the telephone numbers is finished. Then, the group number (for example, "1") is input at step 7. After that, the CPU 17 stores the group number data, which is assigned to one or more abbreviated numbers input by the foregoing operations, into the group number memory area 18c' of the work memory part 18B. Therefore, each abbreviated number may have its own group number or a plurality of (or group of) abbreviated numbers may share a single group number.

If the registration key 6 is pressed at step 8, the CPU 17 judges that all the inputting operations are completed and transfers the abbreviated number data, the telephone number data and the group number data respectively stored in the memory areas 18a'–18c' of the work memory part 18B to the memory areas 18a–18c of the main memory part 18A (step 9).

If the group number is not input at step 7 and the registration key 6 is pressed at step 8, the abbreviated numbers and the telephone numbers are transferred to the memory areas 18a and 18b of the main memory part 18A (step 9).

FIG. 5(b) deals with a case where the call limitation is applied using a group number. If the registration key 6 is pressed at step 10 and the lock key 8 is pressed at step 11, the CPU 17 sets the portable telephone to the call limitation mode. After that, if the group number (for example "2") is input at step 12, the CPU 17 stores the call limitation data "1" in the call limitation data memory area 18d' having a group number address identical with the group number input by the user. When the registration key 6 is pressed at step 13, the call limitation data in the call limitation data memory area 18d' of the work memory part 18B is transmitted to the call limitation data memory area 18d of the main memory part 18A. Preferably, the operation for the call limitation is only enabled by a particular person who knows a secret identification number.

Figure 6:
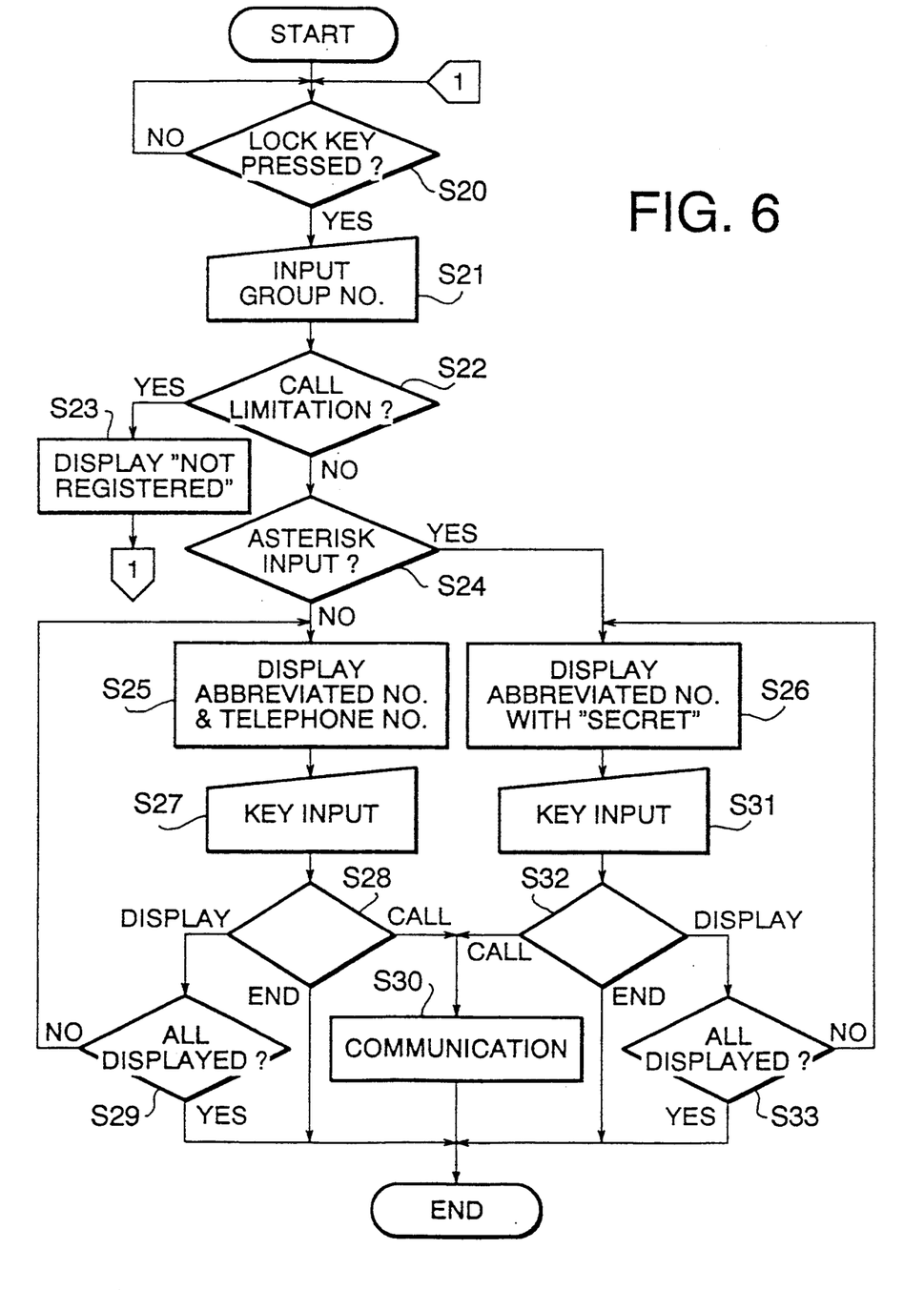
FIG. 6 is a flowchart for referring to an abbreviated number.

FIG. 6 deals with a case where the user refers to the abbreviated number using the registered group number. When the lock key 8 is pressed at step 20, the CPU 17 sets the portable telephone to the abbreviated number reference mode. (In this embodiment, the lock key 8 is also used for the call limitation to the abbreviated number.) If the group number is input using the ten-key 4 at step 21, the CPU 17 judges at step 22 whether the input group number data, i.e., the call limitation data in the call limitation data memory area 18d corresponding to the group number address is "1". If it is "1", the CPU 17 causes the display 13 to display "NOT REGISTERED" at step 28, as shown in FIG. 8. This indication will be canceled after a predetermined period which is measured by a timer (not shown) and the portable telephone 1 returns to a standby condition.

Figure 9:
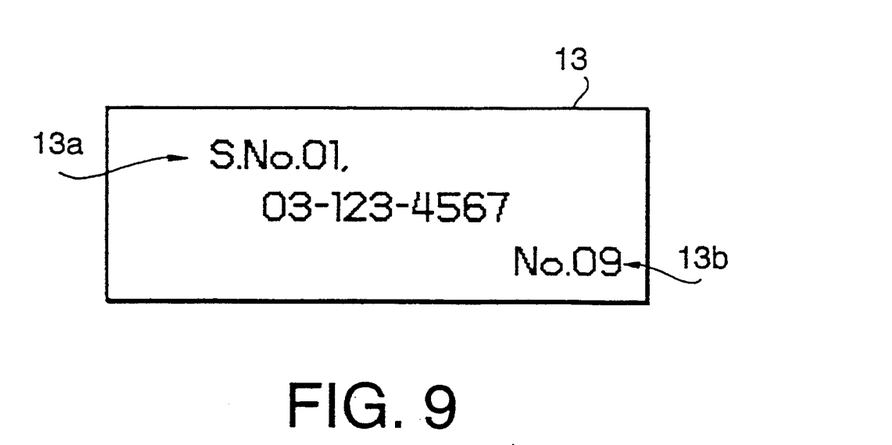
FIG. 9 shows the display when no call limitation is imposed.

If the call limitation data is "0", the CPU 17 believes that there is no call limitation and judges at step 24 whether the group number data input by the user is an asterisk. If it is not the asterisk, the CPU 17 reads the abbreviated number data from the abbreviated number memory area 18a and the telephone number data from the telephone number memory area 18b, which correspond to the group number, and causes the display 13 to display these data, as shown in FIG. 9, at step 25. If there is a plurality of abbreviated number data, an abbreviated number following the first abbreviated number is displayed in the auxiliary display area 13b.

If the group number data input by the user is the asterisk, the CPU 17 reads the abbreviated number data from the abbreviated number memory area 18a corresponding to the group number and causes the display 13 to display "SECRET", instead of the telephone number, as shown in FIG. 7, at step 26. Therefore, the user will see the abbreviated number, but cannot see the telephone number corresponding to the displayed abbreviated number.

Next, the procedure after the displaying of the abbreviated number of step 25 will be explained.

If the next page key 10 is pressed at step 27, the CPU 17 judges at step 28 that the displaying operation for the next abbreviated number and other data will be performed. Then, the CPU 17 judges at step 29 whether all the abbreviated numbers and telephone numbers corresponding to the group number are displayed. If the answer is NO, the program returns to step 25 to display the remaining abbreviated numbers and telephone numbers on the LCD 13. When all the abbreviated numbers and telephone numbers are displayed, the CPU 17 cancels the display after a predetermined period which is measured by a timer (not shown), and then brings the portable telephone 1 into the standby condition.

If the call key 9 is pressed at step 27, the CPU 17 construes that the call should be made with the telephone number displayed in the liquid crystal display 13 at step 28 and then causes the transmitter 28 to send the call signal corresponding to the telephone number data stored in the telephone number memory area 18b at step 30. When the channel is connected with the called party, the conversation starts. After that, when the conversation is finished and the end key 12 is pressed, the portable telephone is set to the standby condition.

If the end key 12 is pressed at step 27, the CPU 17 interprets at step 28 that the reference to the abbreviated number should be finished so that the CPU 17 cancels the display in the liquid crystal display 13 and sets the portable telephone into the standby condition.

Next, the procedure after the displaying of the abbreviated number of step 26 will be explained.

If the next page key 10 is pressed at step 31, the CPU 17 interprets at step 32 that the displaying of next abbreviated number will be conducted. Then, the CPU 17 judges at step 33 whether all the abbreviated numbers corresponding to the group number are displayed. If the answer is NO, the program returns to step 26 to display the remaining abbreviated numbers in the display 13. If all the abbreviated numbers are displayed, the CPU 17 maintains the display for a predetermined period which is measured by the timer (not shown)and cancels the display thereafter to bring the portable telephone into the standby condition.

If the call key 9 is pressed at step 31, the CPU 17 interprets at step 32, like step 28, that the call with the telephone number should be made, and the process for the conversation will be performed in the manner as described above at step 30.

If the end key 12 is pressed at step 81, the CPU 17 interprets at step 32, like step 28, that the reference to the abbreviated number should be ended, and therefore the CPU 17 cancels the display in the liquid crystal display 13 and brings the portable telephone into the standby condition.

As described above, when the asterisk is input as the group number to the portable telephone 1 of the embodiment, all the abbreviated numbers corresponding to the asterisk are displayed, but the telephone numbers corresponding to the abbreviated numbers are not displayed. Therefore, even if the call with the abbreviated number is possible, the telephone number corresponding to the abbreviated number is kept in secret.

When the call limitation to the abbreviated numbers is registered, the group number is input in connection with the abbreviated numbers to restrict the call with any one of the abbreviated numbers and the abbreviated and telephone numbers are not displayed. Therefore, it is possible to hide the abbreviated and telephone numbers to which the call limitation-imposed group number is assigned.

If the asterisk is stored in the group number memory area 18c at the time of calling, the CPU 17 does not allow the reproduction of the touch tone. Accordingly, even if the abbreviated number is input, the telephone number corresponding to the abbreviated number is not displayed in the liquid crystal display 13 and the touch tone is not heard by the user (calling party). Thus, it is possible to prevent that the telephone number will be known from the touch tone.

It should be noted that the present invention is not limited to the above-described embodiment, but various modification, changes and/or additions may be made without departing from the scope and spirit of the invention. For example:

(1) When the group number is input in connection with the abbreviated numbers using the asterisk key 4a, all the abbreviated numbers corresponding to the asterisk are displayed but the telephone numbers corresponding to the abbreviated numbers are not displayed in the illustrated embodiment. In this case, a key of the ten-key set 4 such as "#" may be used instead of the asterisk key;

(2) Ninety-nine two-digit abbreviated number data are stored in the abbreviated number memory area 18a in the embodiment. However, nine hundred and ninety-nine three-digit abbreviated number data may be stored. Further, although a single digit number or an asterisk is stored in the group number memory area 18c in the embodiment, a two-digit number, "#" or an asterisk may be stored; and (3) In the above-described embodiment, 99 abbreviated number data (each abbreviated number consists of a two-digit number) are stored in the abbreviated number memory area 18, but alphabets or numerals having a predetermined number of digits may be stored instead of the abbreviated number data.

As understood from the foregoing description, the portable telephone of the present invention has following technical advantages: even if the call with an abbreviated number is possible, the telephone number of which abbreviated number corresponds to a certain group number is not displayed and if the call with the abbreviated number to which a certain group number is assigned is restricted, the telephone number corresponding to such a group number is not displayed, either. Thus, the telephone number is kept in secret.

We claim:

1. A portable telephone comprising:
first input means for inputting telephone numbers, abbreviated numbers corresponding to telephone numbers, and group numbers, the abbreviated numbers being divided into several groups and each group being assigned one group number, the group numbers being divided into a speed dialing prohibited category and a speed dialing permitted category;
first memory means for storing the abbreviated numbers in connection with the group numbers;
second input means for inputting call limitation data to prohibit a call with the abbreviated number to which the group number of the speed dialing prohibited category is assigned;

second memory means for storing the call limitation data in connection with the group numbers;

display means for displaying the abbreviated number and the telephone number; and control means for controlling the display means in accordance with the group number stored in the first memory means and/or the call limitation data stored in the second memory means.

2. The portable telephone of claim 1, wherein one of the group numbers is an asterisk, and the control means controls the display means to display the abbreviated number but not to display the telephone number corresponding to the abbreviated number when the asterisk is assigned to the abbreviated number.

3. The portable telephone of claim 2, wherein the display means displays "SECRET" when the telephone number is not displayed.

4. The portable telephone of claim 3, wherein if the group number which is assigned to more than one abbreviated number is input, first and second abbreviated numbers are displayed in the display means.

5. The portable telephone of claim 4, further including means for subsequently displaying the abbreviated numbers if the group number is assigned to more than two abbreviated numbers.

6. The portable telephone of claim 5, further including a telephone receiver and the control means does not allow the telephone receiver to produce touch tone when an abbreviated number to which the asterisk is assigned is input by a user.

7. The portable telephone of claim 6, wherein the control means controls the display means to display both the abbreviated number and the telephone number corresponding to the abbreviated number when the asterisk is not assigned to the abbreviated number.

8. The portable telephone of claim 7, wherein the display means is a liquid crystal display.

9. The portable telephone of claim 8, wherein the call limitation data are 37 1" and "0" and if 37 1" is assigned to the speed dialing prohibited category and "1" is input by an operator of the portable telephone, the control means disables the speed dialing with the abbreviated numbers of the speed dialing prohibited category.

10. The portable telephone of claim 9, wherein the display means displays "NOT REGISTERED" when "1" is input.

11. The portable telephone of claim 10, further including means for storing a secret ID number and means for allowing operation of the third input means only to a person knowing the secret ID number.

12. The portable telephone of claim 11, further including means for counting time to cancel the displaying of the display means after a predetermined period.

13. The portable telephone of claim 12, wherein the display means does not display the abbreviated number and the telephone number if the abbreviated number of the speed dialing prohibited category is input.

* * * * *